(12) United States Patent
Mehnert et al.

(10) Patent No.: US 9,784,595 B2
(45) Date of Patent: Oct. 10, 2017

(54) MAGNETIC LINEAR OR ROTARY ENCODER

(71) Applicant: AVAGO TECHNOLOGIES GENERAL IP (SINGAPORE) PTE. LTD., Singapore (SG)

(72) Inventors: Walter Mehnert, Ottobrunn (DE); Thomas Theil, Feldafing (DE)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 3 days.

(21) Appl. No.: 14/761,056

(22) PCT Filed: Feb. 28, 2014

(86) PCT No.: PCT/EP2014/053962
§ 371 (c)(1),
(2) Date: Jul. 15, 2015

(87) PCT Pub. No.: WO2014/135453
PCT Pub. Date: Sep. 12, 2014

(65) Prior Publication Data
US 2016/0033305 A1    Feb. 4, 2016

(30) Foreign Application Priority Data

Mar. 5, 2013 (DE) .................. 10 2013 102 179
Apr. 5, 2013 (DE) .................. 10 2013 103 445

(51) Int. Cl.
*G01R 33/02* (2006.01)
*G01B 7/14* (2006.01)
(Continued)

(52) U.S. Cl.
CPC .......... *G01D 5/2216* (2013.01); *G01D 5/145* (2013.01); *G01D 3/036* (2013.01)

(58) Field of Classification Search
CPC .............................. G01D 5/145; G01D 5/2451
(Continued)

(56) References Cited

U.S. PATENT DOCUMENTS 6,488,762 B1    12/2002 Shi
7,208,943 B2 *   4/2007 Godoy ................. G01D 11/245
                                                            174/521
(Continued)

FOREIGN PATENT DOCUMENTS

DE       4224225 A1    1/1994
DE      10225417 A1    2/2003
(Continued)

OTHER PUBLICATIONS

Communication dated Apr. 4, 2014 from the German Patent Office issued in corresponding Application No. 102013103445.4.
(Continued)

*Primary Examiner* — Reena Aurora
(74) *Attorney, Agent, or Firm* — Sheridan Ross P.C.

(57) ABSTRACT

The invention relates to a magnetic linear or rotary encoder (1) for monitoring the motion of a body, comprising: an exciting unit (8), which reproduces said motion and has at least one pair of primary permanent magnets (16, 17), which are arranged opposite one another and are magnetically connected to one another by means of a ferromagnetic yoke body (9) and form a measurement field space therebetween; a fine-resolution sensor unit (29; 29'), which is used to determine a fine position value, is arranged in a stationary manner and has a plurality of magnetic field sensors (25, 26, 27, 28); and processing electronics, which evaluate the signals of the fine-resolution sensor unit and have a data memory. Said magnetic linear or rotary encoder is characterised in that a ferromagnetic deflecting body (18) is provided, which deflects at least some of the magnetic field
(Continued)

Figure 1:
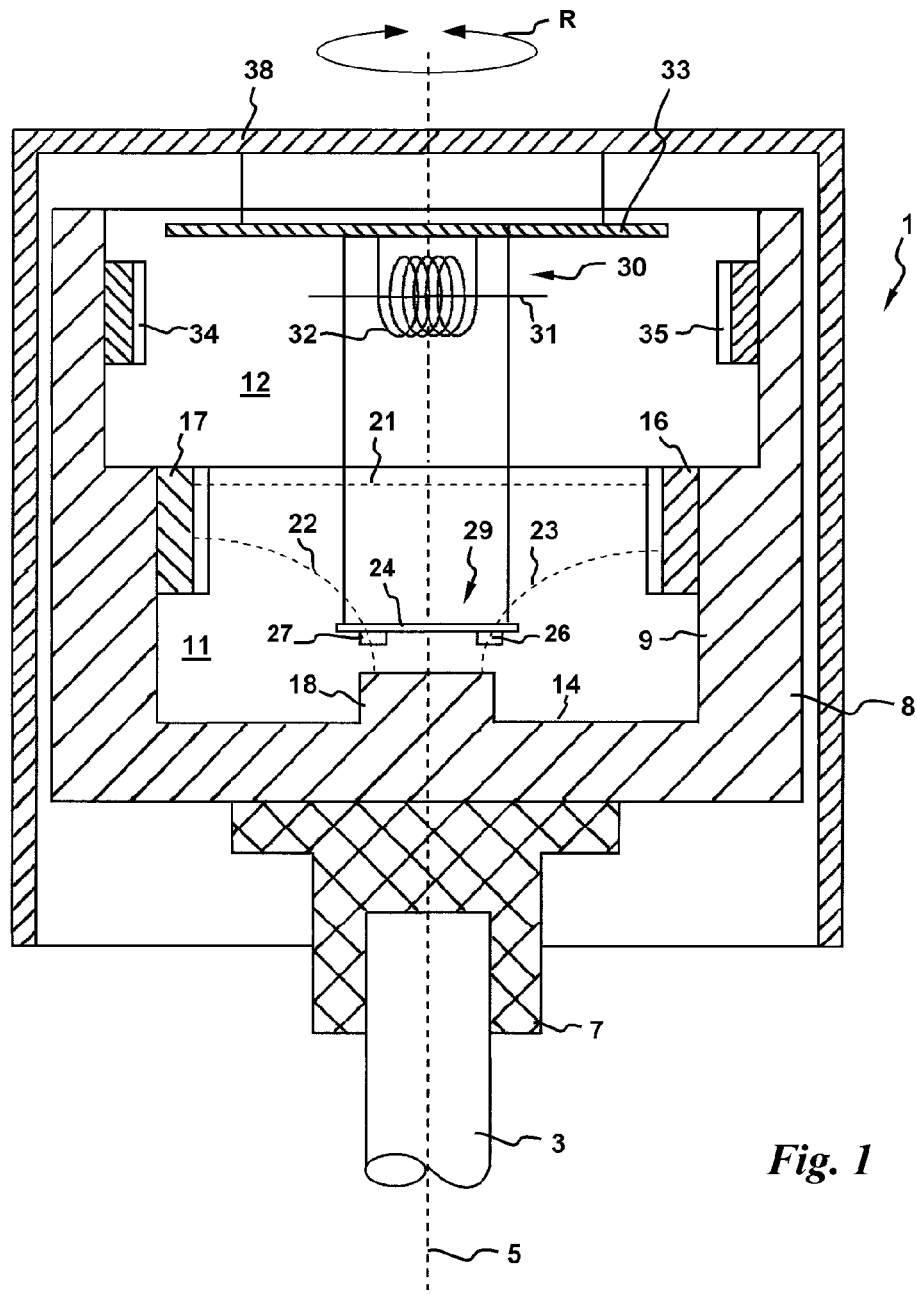

lines of the magnetic field produced by the primary permanent magnets in a direction perpendicular to the magnetisation vector of the primary permanent magnets, that the fine-resolution sensor unit is designed and arranged in such a way that the individual magnetic field sensors of the fine-resolution sensor unit are penetrated by the magnetic field lines deflected by the deflecting body by means of a perpendicular component, that at least the yoke body is made of a thermally treated, ferromagnetic material, and that the fine-resolution sensor unit does not contain a ferromagnetic component.

15 Claims, 5 Drawing Sheets

(51) Int. Cl.
    *G01D 5/22*    (2006.01)
    *G01D 5/14*    (2006.01)
    *G01D 3/036*   (2006.01)

(58) Field of Classification Search
    USPC .................................. 324/207.15, 207.13
    See application file for complete search history.

(56) References Cited

U.S. PATENT DOCUMENTS

| | | | |
|---|---|---|---|
| 7,595,635 B2* | 9/2009 | Uemura | G01D 5/145 |
| | | | 324/207.2 |
| 8,203,332 B2* | 6/2012 | Guo | G01D 5/145 |
| | | | 324/207.21 |

FOREIGN PATENT DOCUMENTS

| | | |
|---|---|---|
| DE | 60100393 T2 | 5/2004 |
| DE | 102007039050 A1 | 2/2009 |
| DE | 102009023515 A1 | 1/2011 |
| DE | 102010010560 B3 | 9/2011 |
| DE | 102010022154 A1 | 10/2011 |
| DE | 102010050356 A1 | 11/2011 |
| EP | 2549236 A1 | 1/2013 |
| FR | 1537362 | 8/1968 |
| JP | H06-309573 | 11/1994 |
| JP | 2002-22487 | 1/2002 |
| JP | 2003-42709 | 2/2003 |
| JP | 2006-300736 | 11/2006 |
| JP | 2009-47426 | 3/2009 |
| JP | 2009-539075 | 11/2009 |
| WO | 98/54547 A1 | 12/1998 |
| WO | WO 2011/124348 | 10/2011 |

OTHER PUBLICATIONS

International Search Report dated Jun. 18, 2014 in counterpart application No. PCT/EP2014/053962.

Ozyagcilar, Talat "Layout Recommendations for PCBs Using a Magnetometer Sensor", Freescale Semiconductor, Inc., 2012 (13 pages total).

Official Action for Japan Patent Application No. 2015-560631, dated Mar. 7, 2017, 8 pages.

* cited by examiner

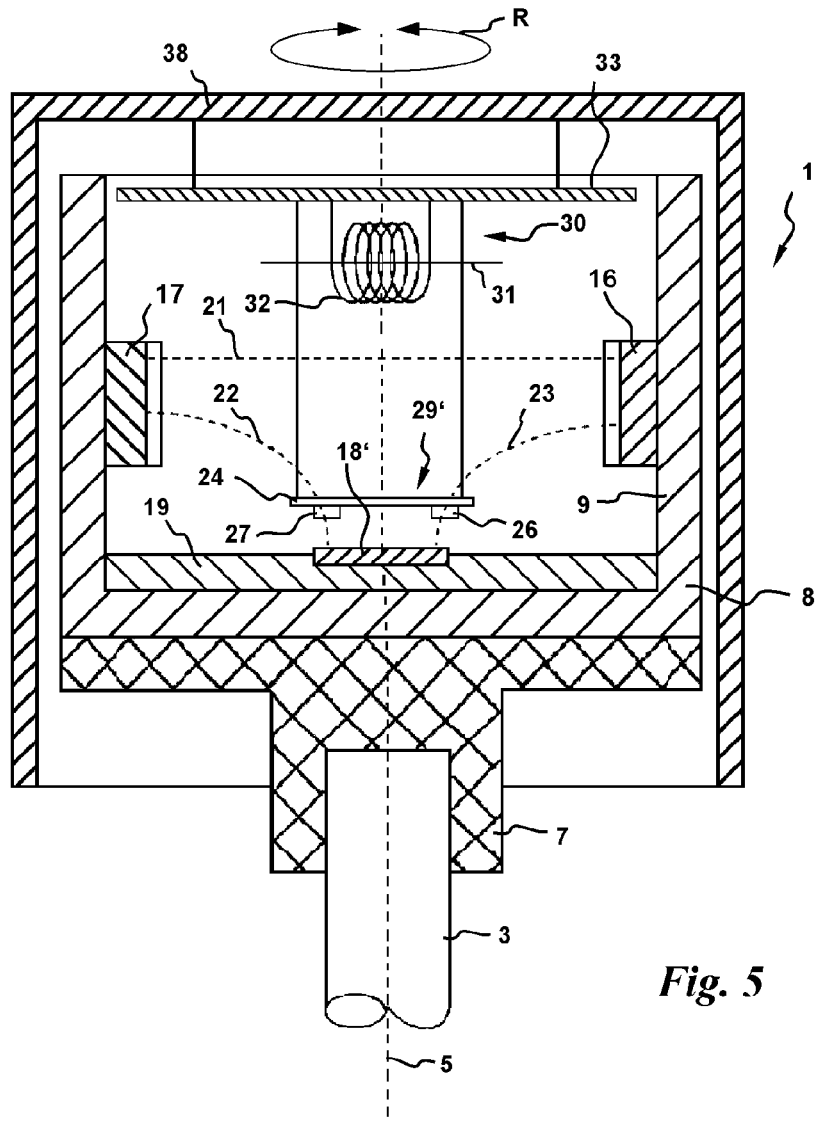
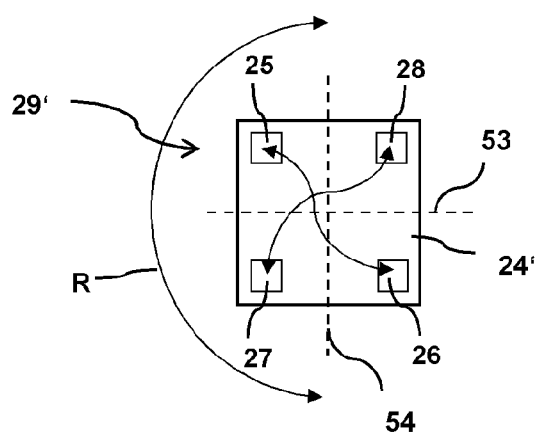
Fig. 5
Fig. 6

MAGNETIC LINEAR OR ROTARY ENCODER

CROSS REFERENCE TO RELATED APPLICATIONS

This is a National Stage of International Application No. PCT/EP2014/053962 filed Feb. 28, 2015, claiming priority based on German Patent Application No. 10 2013 102 179.4 filed Mar. 5, 2013 and German Patent Application No. 10 2013 103 445.4 filed Apr. 5, 2013, the contents of all of which are incorporated herein by reference in their entirety.

The invention concerns a magnetic linear or rotary encoder of the kind set forth in the classifying portion of claim 1. Such encoders are described for example in DE 10 2007 039 050 A1 and DE 10 2010 022 154 A1.

DE 10 2009 023 515 A1 and DE 10 2010 010 560, in connection with comparable encoders, note that, to achieve highly accurate measurement results, it is necessary to ascertain the magnetic field values characteristic for the respective position, by means of for example four magnetic field sensors in order to be able to form from the respectively occurring for example four measurement values two differences and from same a quotient (ratiometric difference process) so as to be able to eliminate the influences both of additive disturbance factors (for example extraneous magnetic fields superimposed on the measuring magnetic field) and also multiplicative disturbance factors (for example temperature-governed drift phenomena). The use of that process is theoretically beyond dispute a condition necessary to achieve highly accurate measurement results. A detailed representation of that process which is dependent on the nature of the sensors used is to be found in DE 42 24 225 A1—even if for inductive position sensors—.

In practice it is found however that, even when using the ratiometric difference process, the measurement results fluctuate because of environmental influences whereby the achievable degree of accuracy is undesirably limited.

Therefore the object of the invention is to provide a magnetic linear or rotary encoder of the kind set forth in the opening part of this specification, in which the measurement accuracy can be considerably increased.

To attain that object the invention provides the features summarised in claim 1.

The invention is based on the realisation that the use of the ratiometric difference process for achieving highly accurate measurement results presupposes as an adequate condition that the percentage change in the measurement field which is influenced by environmental parameters is the same in all magnetic field sensors of the fine-resolution sensor unit at least during a measurement cycle in every possible position and at every moment in time. The term measurement cycle is used to denote the period of time in which the linear or rotary encoder generates an individual measurement value of given accuracy and resolution. That condition is met when the crystalline structure of the ferromagnetic circuit, in a defined range of changing environmental parameters, remains generally homogeneous or in the simplest case unchanged in a first approximation (magnetic reluctance of the measuring circuit $R_m$=constant). That ensures for example that the relationship between the exciter magnetic field and the measurement fields perceived by each of the magnetic field sensors is linear.

If a, b, c and d are the signals of the corresponding magnetic field sensors and $\gamma$, $\eta$ are factors of a multiplicative disturbance factor and $\Delta$ is an additive disturbance factor, then in the ideal case ($\eta=1$) the following applies for the measurement value m in relation to a solid-shaft rotary encoder if there are pure sine and cosine signals:

$$m = \frac{\gamma[(a+\Delta)-(b+\Delta)]}{\gamma[(c+\Delta)-(d+\Delta)]}\bigg|_{R_m=constant} \quad (1)$$

Ferromagnetic materials greatly change their structure and therewith their magnetic properties in particular with temperature. In accordance with the invention therefore basically all ferromagnetic parts of the encoder, with which the measurement field comes into contact, should be tempered, that is to say subjected to a heat treatment so that their crystal structure is stabilised insofar as it remains unchanged or homogeneous in relation to normal temperature fluctuations (that is to say in a temperature range of between about −50° C. and about +150°).

To achieve the aim that the invention seeks to attain however it is generally sufficient at least for the ferromagnetic elements which are disposed in the immediate proximity of the exciter magnetic field, for example the magnetic yoke body and the deflection body, to be subjected to a heat treatment. It will be noted however that in that case the exciter magnetic field must at the same time be shielded relative to the exterior in such a way that existing residual field strengths by which temperature-dependent ferromagnetic components like for example the cap used for shielding can suffer fluctuations no longer exert any influence on the measurement result. In a development of the invention therefore the magnetic yoke body and the deflection body are made from a tempered ferromagnetic metal, preferably mu-metal.

A one-piece structure for the deflection body and the magnetic yoke body is advantageous, but that is not absolutely necessary if the magnetic action of a one-piece body is achieved by magnetically separated bodies.

In addition it is advantageously provided that only those electronic components like ICs and capacitors are used, which do not contain any ferromagnetic constituents in their housing. If that is not possible those electronic components are arranged so far away from the exciter field that the changes in their magnetic properties, caused by temperature fluctuations, can practically no longer influence the measurement field.

To avoid an adverse influence in respect of the measurement accuracy due to hysteresis effects it is preferable if the deflection body also moves with the exciter unit and therefore for example in the case of a rotary encoder rotates therewith.

In addition it is necessary to eliminate extraneous fields which come from the exterior and which interfere with the measurement result. For that purpose in addition to the tempered magnetic yoke body the sensor includes a ferromagnetic shield which however does not have to be tempered. The purpose thereof is to attenuate external fields to such an extent that, in the internal space embraced by the mu-metal body, the residual field tends towards zero or only (additive) interference fields which are perpendicular to the magnetic field sensors occur. As tempered elements are shock-sensitive because their crystal structure can be restored to the original condition again by shocks the non-tempered shield serves at the same time as mechanical protection.

In many cases it is not possible to stabilise a ferromagnetic encoder shaft by tempering; in that respect also the cup-shaped or basin-shaped magnetic yoke body serves jointly with the deflection body to shield the exciter field relative to the exterior.

Thus the specified steps provide a magnetic linear or rotary encoder in which the ratiometric difference process rests on a proper theoretical basis and leads to measurement results of the highest accuracy.

Figure 2:
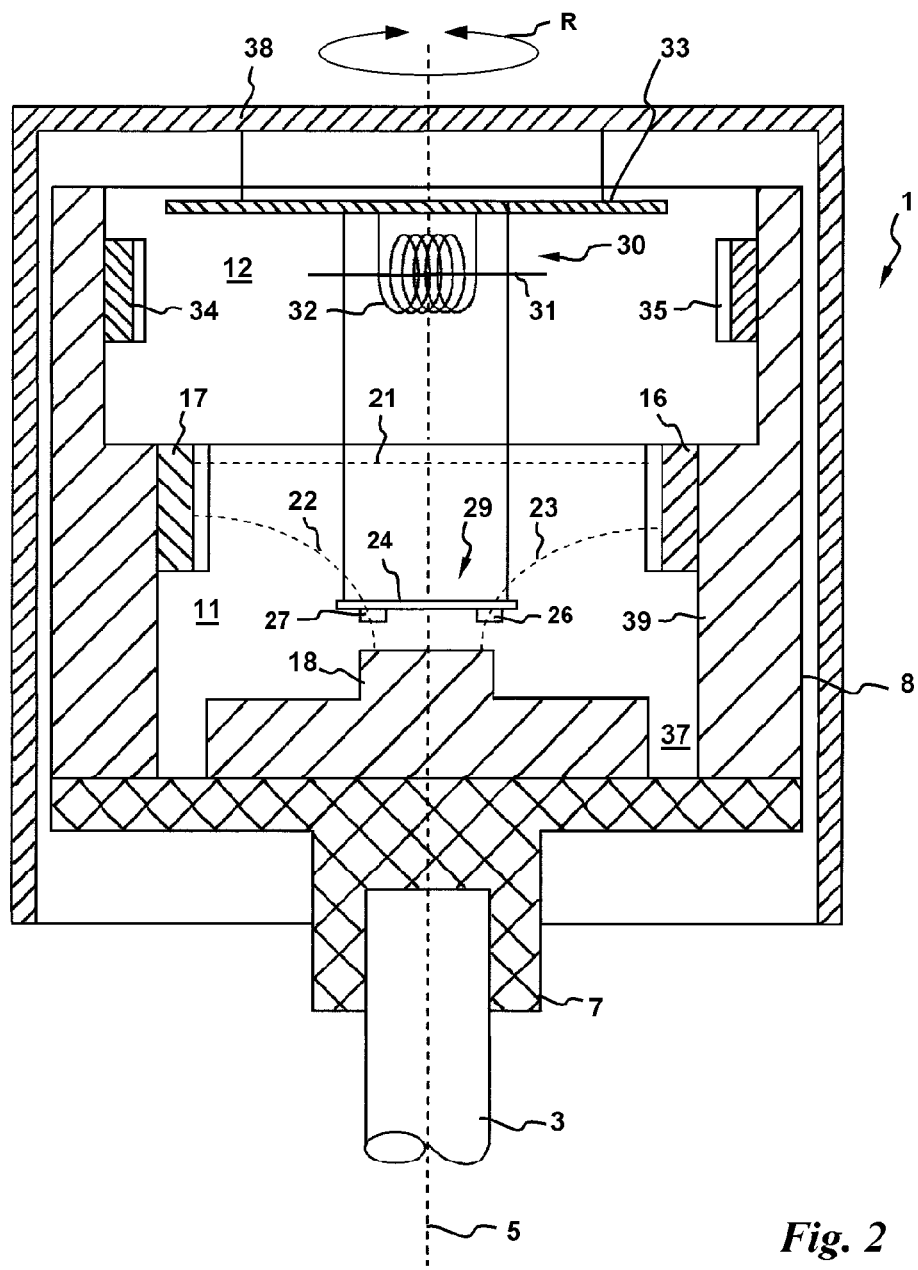
Figure 3:
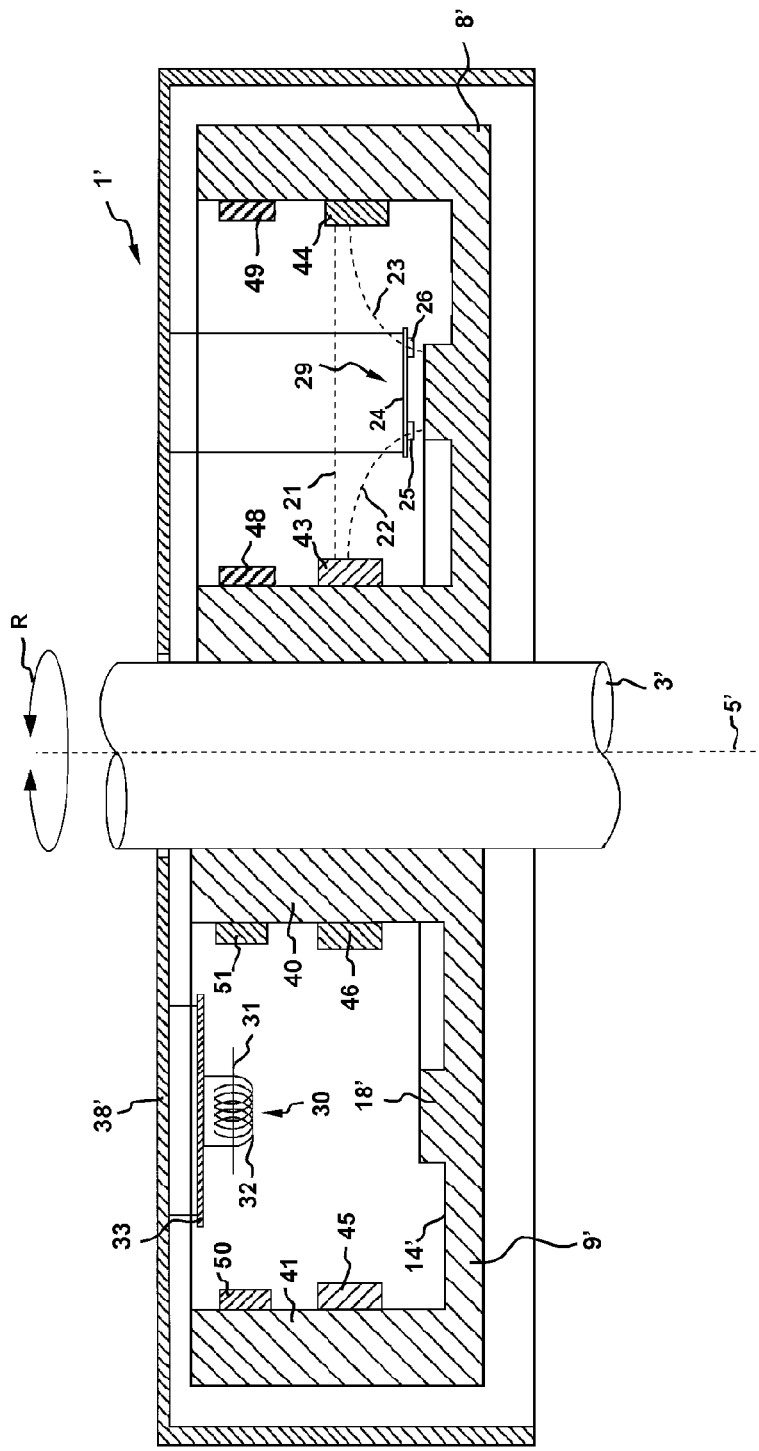
Figure 4:
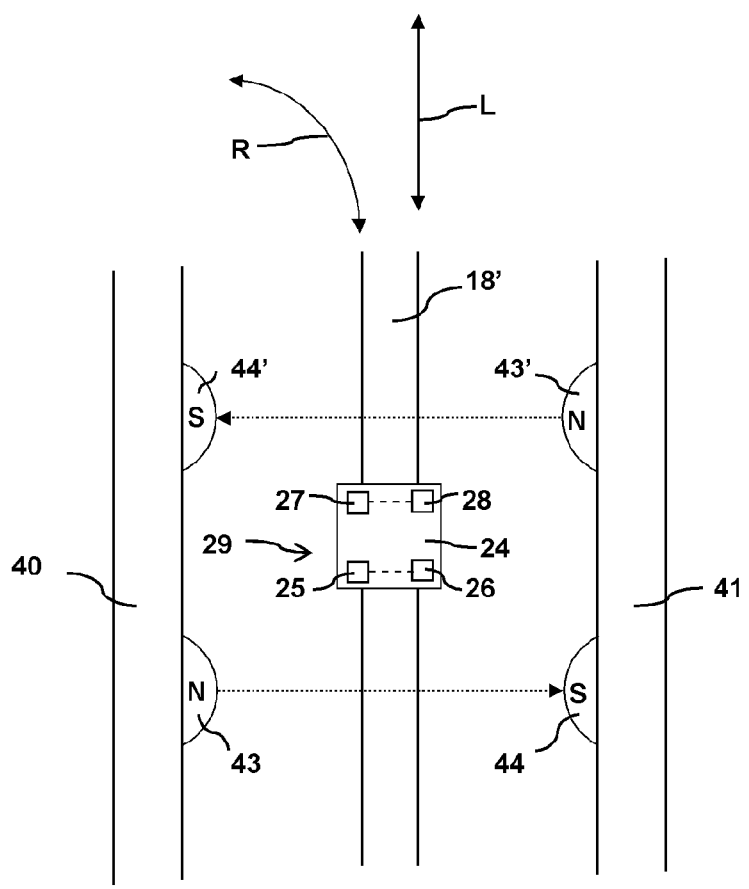

The invention is described hereinafter by means of an embodiment by way of example with reference to the drawing in which:

FIG. 1 shows a highly diagrammatic sectional view through a rotary encoder according to the invention (solid-shaft encoder) which is fitted on to the free end of a shaft, FIG. 2 shows a section corresponding to FIG. 1 through another embodiment of a solid-shaft encoder according to the invention, FIG. 3 shows on a different scale a section corresponding to FIGS. 1 and 2 through a rotary encoder according to the invention which has a central through bore (hollow-shaft encoder) through which a shaft whose rotary movement is to be monitored is fitted in such a way that the two ends thereof are freely accessible, FIG. 4 shows a plan view on a different scale of the right-hand side of the arrangement of FIG. 3 in the direction of the arrow I, FIG. 5 shows a section corresponding to FIG. 1 through a further embodiment of a solid-shaft encoder according to the invention, and FIG. 6 shows a plan view of the fine-resolution sensor unit of the solid-shaft encoder of FIG. 5 in the direction of the axis of rotation.

In the Figures the same parts or mutually corresponding parts are denoted by the same references, provided in part in FIGS. 3, 5 and 6 with a'. When hereinafter expressions like "up", "down" and the like are used that relates exclusively to the view in the respective Figure as the linear or rotary encoder according to the invention can be used in any desired spatial orientation. It is expressly pointed out that the Figures are not true to scale, for the purpose of merely indicating essential details.

FIG. 1 shows a rotary encoder 1 having a shaft 3 which can rotate in both directions about its central longitudinal axis 5, as indicated by the double-headed arrow R. That shaft 3 can be the shaft itself that is to be monitored or an encoder shaft coupled to the actual shaft to be monitored, mechanically, for example by a transmission, in such a way that it clearly represents the rotary movement thereof.

A rotationally symmetrical carrier 7 comprising a non-ferromagnetic material, for example plastic, aluminium, brass or the like is non-rotatably mounted on the free end of the shaft 3, that is upward in FIG. 1. On its flat end face which is upward in FIG. 1 and which is remote from the shaft 3 it carries an exciter unit 8 which is non-rotatably connected thereto and which includes a circular-cylindrical cup 9 of ferromagnetic material, which is rotationally symmetrical relative to the longitudinal axis 5.

The internal cavity of the cup 9 here has two portions 11, 12 of differing diameters, adjoining each other in the axial direction. The portion 11 of the smaller diameter directly adjoins the bottom 14 of the cup 9, that extends perpendicularly to the longitudinal axis 5, while the further outwardly disposed portion 12 of larger diameter opens into the upward opening of the cup 9.

Two mutually diametrically oppositely disposed primary permanent magnets 16, 17 are mounted symmetrically relative to the axis of rotation 5 on the inside wall of the lower portion 11 in such a way that with a respective one of their two poles they bear against the inside wall of the cup 9 while their free inwardly directed poles N and S face towards each other. The magnetic dipoles of the primary permanent magnets 16, 17 preferably all extend in the same direction which is defined by the two magnetisation vectors which extend through their respective centre of gravity and face in the same direction. That therefore forms a central field space directly connecting the two primary permanent magnets 16 and 17.

That arrangement provides that the two permanent magnets 16, 17 of which each can extend in the peripheral direction for example over an annular range of 45° are magnetically connected together by the cup 9 forming a return yoke body.

The two magnets are preferably of the same size and involve approximately the same magnetic field strength.

The magnetic field produced between their poles is deformed by a deflection body 18 of ferromagnetic material, which is arranged concentrically relative to the longitudinal axis 5 and which projects upwardly from the bottom 14 of the cup 9 in the direction of the longitudinal axis 5 and is of a circular configuration in plan.

The consequence of deformation of the measuring magnetic field is that not all magnetic field lines coming from one of the primary permanent magnets 16 and 17 extend more or less in a straight line and parallel to the bottom 14 of the cup 9 to the respective other primary permanent magnets 17 and 16 respectively, as is shown for the magnetic field line 21, but that some field lines admittedly begin at one of the two poles N or S respectively but are curved in such a way that they pass into the deflection body 18, as is diagrammatically shown for the two lines 22, 23.

A carrier (not shown) in the shape of a circuit board and comprising a non-ferromagnetic material is mounted stationarily in the region of the deformed magnetic field, that is to say at a small axial spacing above the upper surface of the deflection body 18, that is to say in such a way that it does not also perform the rotary movement of the shaft 3, the cup 9 and the primary permanent magnets 16, 17.

Mounted at the underside of the carrier is an integrated circuit (IC) 24 in which for example there are four magnetosensitive elements 25, 26, 27, 28 (in the section in FIG. 1 only the two magnetosensitive elements 27 and 26 are visible), whose active surfaces extend in a plane which is parallel to the bottom 14 of the cup 9 and perpendicular to the axis of rotation 5. As can be seen in particular from FIG. 4 each of the four magnetosensitive elements 25, 26, 27, 28 is so arranged in the region of one of the four corners of the IC 24 that, in the plane of the plan view, their mutual spacings are substantially greater than their dimensions in that plane (up to 50 times as great). In addition to the four magnetosensitive elements 25, 26, 27, 28 the IC 24 can also include all the electronic circuits required for evaluation of their output signals and for ascertaining the fine-positional value therefrom, or however at least parts of such circuits.

The active surfaces of the four magnetosensitive elements 25, 26, 27, 28 are transited by the magnetic field lines 22, 23 with a component which is perpendicular thereto, that is to say parallel to the longitudinal axis 5, so that electrical signals b, c, d, a can be read off at their outputs, the amplitudes of which signals change upon a rotary movement of the shaft 3 and therewith the exciter unit 8 so that the respective instantaneous angular position of the shaft 3 can be ascertained from them.

The IC 24 together with the magnetosensitive elements 25, 26, 27, 28 which are provided therein and which for example can involve Hall probes form a fine-resolution sensor unit 29 which makes it possible to ascertain the instantaneous angular position of the shaft 3 in the respective measurement angle range with a high level of accuracy.

In the solid-shaft sensor shown in FIG. 1 the four Hall elements arranged in a square configuration are respectively connected diagonally (in cross-over relationship) in two groups, wherein, in accordance with DE 10 2012 002 204 which is not a prior publication, the mutual spacings of the Hall elements are large in relation to their diameter.

Because the deflection body 18 rotates with the measuring magnetic field produced by the exciter unit 8, hysteresis effects which falsify the measurement result are completely eliminated.

If as an optimum only two primary permanent magnets 16, 17 are disposed on the inside of the cup 9 in the lower portion 11 that affords two measurement intervals, the implementation of which provides that it is possible to read off at the outputs of the connected magnetosensitive elements 28, 27 a sine signal and at 26, 25 a cosine signal which respectively extend over an electric angle of 180° so that a pair of periodic signals with a phase of 360° respectively also corresponds to a geometrical rotational angle of the shaft 3 of 360°.

To ascertain a clear angular position in the event of rotations of more than 360° it is necessary to count the measurement intervals implemented. That applies even when there are more than two pairs of mutually diametrally oppositely disposed primary permanent magnets so that more than two measurement intervals are covered in a respective revolution of the shaft 3 over 360°.

For that purpose arranged in the further outwardly disposed portion 12 of the bore of the cup 9 is a counting unit 30 which includes a Wiegand wire 31 extending approximately parallel to the bottom 14 of the cup 9, and a coil 32 surrounding the wire 31, both of which are mounted to a carrier 33 which is stationary, that is to say which does not also perform the rotary movement of the exciter unit 8, and to which the IC 24 is also fixed.

Two further permanent magnets 34, 35 are mounted at the inside wall of the portion 12 of larger diameter, in the same manner as was described hereinbefore for the two primary permanent magnets 16, 17; they can admittedly be of the same thickness and strength as the primary permanent magnets 16, 17, but their mutually facing poles N, S are at a larger spacing than the poles N, S of the primary permanent magnets 16, 17 because the working field strength of the Wiegand wire 31 is less than that of the Hall probes.

Instead of a stepped cup with magnets 16, 17 and 34, 35 of the same thickness it is also possible to use a continuous cup with magnets of different thicknesses or involving different magnetic properties.

In principle the two further permanent magnets 34, 35 could also be omitted and the counting unit 30 could be arranged in the upper stray field region of the two primary permanent magnets 16, 17. Such a positioning however is comparatively critical because the counting unit 30, for satisfactory operation, requires fields whose field strength is closely defined. The axial spacing of the Wiegand wire 31 from the central region of the magnetic field of the primary permanent magnets 16, 17 would therefore have to be relatively accurately established and maintained, which however is possible in many application situations.

Therefore the illustrated variant is to be preferred because it makes it possible for the Wiegand wire 31 to be arranged at a sufficiently large spacing from the field of the primary permanent magnets 16, 17 and to provide for its working field strength to be optimum by a suitable configuration of the further permanent magnets 34, 35 and independently of the field strength passing through the magnetosensitive elements 25, 26, 27, 28. The interference disturbances which the Wiegand wire can exert upon switching on the measurement field are minimised by the magnetic yoke body 9 and by a spacing which is as large as possible of the Wiegand wire from the measuring magnetic field.

Whenever the diameter connecting the further permanent magnets 34, 35 passes through a given angular position in relation to the Wiegand wire 31 then a change in magnetisation is produced therein in known manner, which leads to the production of a voltage pulse at the outputs of the coil 32, which serves both as a counting pulse for counting the measurement intervals implemented and also as a current supply pulse for the electronic processing means (not shown) which can also be mounted on the carrier 33 when it does not include any ferromagnetic constituents. For detecting the direction of rotation it is possible to provide in per se known manner an additional sensor element (not shown here) which does not include any ferromagnetic constituents and which respectively responds once for each measurement interval to the magnetic field or fields of the exciter unit 8.

Both in regard to its above-described geometrical configuration and also its function as a multiturn which can both resolve each of the individual measurement intervals with a high degree of accuracy and can also count off the number of measurement intervals implemented while having regard to the direction of rotation, a rotary encoder according to the invention substantially corresponds to a combination of the encoders described in DE 10 2007 039 050 A1 and DE 10 2010 022 154 A1. In particular the latter describes a ferromagnetic deflection body which also rotates with the shaft and thus also with the exciter unit.

A substantial difference in the rotary encoder shown in the present example in relation to that state of the art is that the ferromagnetic yoke body member of the exciter unit 8 forms a cup 9 which is closed at the bottom end and the deflection body 18 is not formed by the shaft to be monitored or the encoder shaft 3. It can either be in the form of a projection in the shape of a circular ring, which as an integral constituent part of the cup 9 protrudes upwardly above the bottom 14 thereof, or it can be formed by a separate cylindrical component which is arranged at an axial spacing above the bottom 14 and which rotates with the cup. In the latter case the additional magnetic reluctance of the "air gap" formed between the deflection body and the bottom of the cup can provide that at least a part of the magnetic field lines extends from one of the two permanent magnets through the deflection body directly to the other permanent magnet. The deformation of the magnetic field lines, that is required for passing perpendicularly through the magnetic field sensors, is retained in that case.

Using the flat bottom of the cup 9 directly for deflection of the magnetic field lines would be disadvantageous because that would mean that the measurement field is too weak.

The closed bottom of the cup 9 provides for substantially shielding the measuring magnetic field towards the shaft 3 so that the magnetic changes therein cannot have any reactions on the measuring magnetic field. In addition extraneous magnetic fields which are coupled in from the exterior through the shaft are attenuated or symmetrised to an adequate degree.

It is further provided according to the invention that the cup 9 and the deflection body 18 are tempered so that in the event of temperature fluctuations no changes in the crystalline structure thereof occur and can non-uniformly distort the magnetic field present in the measuring field space.

What is quite essential is the condition that the housing of the fine-resolution sensor unit 29 does not include any ferromagnetic constituents because it is necessarily arranged in the proximity of the exciter magnets. The adverse influence of such a ferromagnetic housing, which occurs for example in the event of changes in temperature, on the measurement result, is exorbitant.

A stationarily arranged shield 38 which for example is in the form of a cap or hood and consisting of soft iron substantially encloses the cup 9 and protects on the one hand its open top side from the ingress of magnetic extraneous fields and on the other hand protects the entire cup 9 from shocks which could restore its crystalline structure to the original, non-tempered condition again. The axial length with which the shield 10 embraces the cup 9 can vary within the limits which are predetermined by the need to perform those two protective functions.

In addition the shield 38 can serve to hold the carrier 33 for the counting unit 30 and thus also the fine-resolution sensor unit 29. It is essential that the internal space enclosed by the cup 9 does not include any ferromagnetic bodies, the crystal structures of which change with temperature. Therefore both the primary and also the further permanent magnets 16, 17 and 34, 35 respectively are preferably tempered.

The solid-shaft encoder 1 shown in FIG. 2 is almost identical to that shown in FIG. 1 so that it is sufficient hereinafter to describe only the minor differences between the two variants, which essentially provide that the yoke body is no longer formed by a cup with a closed bottom but a ring 39 comprising a tempered ferromagnetic material which is no longer connected in one piece to the deflection body 18 but is separated therefrom by an air gap 37 in the form of a circular ring. The carrier 7 of non-ferromagnetic material is of a larger diameter in comparison with FIG. 1 and is non-rotatably connected both to the ring 39 and also to the deflection body 18. As the air gap 37 in practice can be kept substantially less than shown in FIG. 2 this embodiment also ensures that the measuring magnetic field is protected from magnetic changes in the shaft to an adequate degree.

The embodiment shown in FIG. 3 is a rotary encoder 1' which is used as a so-called "hollow-shaft encoder" in relation to shafts 3' whose two ends must remain free for connection to other components.

Here the ferromagnetic yoke body is in the form of a tray 9' in the form of a circular ring, of U-shaped cross-section whose side walls 40, 41 which project upwardly at a right-angle from the bottom 14' concentrically surround the shaft 3' to which the inner side wall 40 of the tray 9' is non-rotatably connected.

In this case also the deflection body 18' of ferromagnetic material is connected in one piece to the bottom 14' of the tray 9' and projects upwardly therefrom in such a way that its upwardly disposed flat surface is of a configuration in plan which is in the shape of a circular ring and which is concentric with the shaft 3' and is for example at equal spacings relative to both side walls 40, 41. Similarly to the alternative shown in relation to FIG. 1 in this case also the deflection body can be in the form of an independent component of ferromagnetic material, which is separate from the yoke body and which rotates therewith.

A fine-resolution sensor unit 29 is stationarily suspended in the upwardly open tray 9' similarly to FIGS. 1 and 2, the structure and mode of operation of the unit 29 being identical to the structure and operation of the corresponding unit in FIG. 1 and therefore not being described again here. The same also applies to the counting unit 30 which however is preferably suspended stationarily in the tray 9' on the side in diametrally opposite relationship to the fine-resolution sensor unit 29 with respect to the shaft 3' in order to very substantially minimise the reactions of the switching Wiegand wire 31 on the fine-resolution sensor unit 29.

In regard to the fine-resolution sensor unit 29 however it is to be noted here that the groups respectively comprising two sensor elements extend in mutually parallel relationship perpendicularly to the direction of movement (see also DE 10 2009 034 744 A1) and are also respectively connected in that direction.

In this case also it is necessary for the housing of the sensor elements not to include any ferromagnetic constituents. Instead of using a housing the sensor chip can also be bonded directly on to a circuit board. In that case however it is necessary to reckon on mechanical stress which makes the measurement system temperature-dependent again. Those considerations naturally also apply to the embodiment of FIG. 1.

The exciter unit 8' here includes a plurality of pairs, that is to say two or more, arranged at the insides of the side walls, of mutually oppositely disposed primary permanent magnets which face towards each other with their respective opposite poles, of which only the two pairs 43, 44 and 45, 46 are visible in FIG. 3. Those pairs of primary permanent magnets are at equal angular spacings in the peripheral direction and involve alternate polarities so that, on each of the side walls 40, 41, as viewed in the peripheral direction, a primary permanent magnet which faces with its North pole into the interior of the tray 9' is followed by a next one whose South pole faces towards the interior of the tray, and so forth.

A corresponding consideration applies to the further permanent magnets 48, 49, 50, 51 which serve for counting off the measurement intervals which are predetermined by the primary permanent magnet pairs 43, 44 and 45, 46 and so forth. Unlike the embodiment shown in FIG. 1, in this case the internal space of the tray 9' is not stepped so that the inside surfaces of its side walls 40, 41 are everywhere at the same spacing from each other. The further pairs 48, 49 and 50, 51 of permanent magnets arranged in the upper region are thinner and weaker than the primary permanent magnet pairs 43, 44 and 45, 46 which are arranged closer to the bottom 14'.

In this case also there is provided a shield 38' of soft iron, which encloses the tempered tray 9' at least to such an extent that it is protected from mechanical shocks and no troublesome extraneous fields can pass into the interior of the tray 9'.

The further permanent magnets 48 and 49 are omitted for the sake of greater clarity in the plan view of FIG. 4 in which the arrow R indicates the direction of movement of a hollow shaft rotary encoder and the arrow L denotes the direction of movement of a linear encoder. In return the primary permanent magnets 43', 44' which are not shown in FIG. 3 are shown here, which are arranged "after" the primary permanent magnets 43, 44, as viewed in the direction of the arrows R and L respectively, and are of opposite polarity thereto. The IC 24 is shown disproportionately large in order to make it clear that the four magnetosensitive elements 25, 26, 27, 28 which are provided therein on its underside and which preferably involve Hall probes are arranged at large mutual spacings in the four corner regions thereof. The four magnetosensitive elements are combined in circuitry terms to constitute pairs 28, 27 and 26, 25 in such a way that the differences of their output signals a-d and c-b are formed.

As will be seen the connecting lines of each pair extend radially or perpendicularly relative to the direction of movement R. In other words: the groups 28, 27 and 26, 25 respectively comprising two sensor elements here deliver a respective approximately sinusoidal signal. The phase shift of those two signals can be of any value and here as shown in FIG. 4 is about 45°.

The condition, by means of which it is possible to ascertain m for hollow-shaft rotary encoders and linear encoders (see DE 10 2010 010 560) reads as follows:

$$\left.\frac{\gamma[(a(x)+\Delta)-(d(x)+\Delta)]}{\gamma[(c(x)+\Delta)-(b(x)+\Delta)]}\right|_{R_m(x)=constant} = \left.\frac{a(m)-d(m)}{c(m)-b(m)}\right|_{R_m(m)=constant}$$

with the result x=m for $R_m(x)=\eta R_m(m)$,
wherein a denotes the signal of the magnetosensitive element 28, b the signal of the magnetosensitive element 25, c the signal of the magnetosensitive element 26, d the signal of the magnetosensitive element 27 and $R_m(x)$, $R_m(m)$ denotes the magnetic reluctance of the measuring circuit, x denoting the measuring instantaneous value and m denoting the respective target value. While in the case of the solid-shaft rotary encoder the measurement value m can be ascertained directly from the formula (1) the signals a, b, c, d in the case of the hollow-shaft rotary encoder and linear encoder only represent addresses, at which the measurement target values m are stored in a memory.

The structure of a linear encoder according to the invention can be easily deduced from the embodiment described in relation to FIGS. 3 and 4. If the tray 9' is considered to be cut open along a radius extending from the central longitudinal axis 5 and straightened out (radius of curvature infinite) then that gives an arrangement which can be used as a linear encoder. It is clear that the length of such a "straightened out" tray can be selected as desired and can be equipped with a number of primary permanent magnet pairs, that can be freely adapted to the respective situation of use.

Similarly to the solid-shaft encoder shown in FIG. 1 it is also possible in relation to a hollow-shaft encoder for the yoke body arrangement which is then formed by two concentric rings comprising a tempered ferromagnetic material and the ferromagnetic deflection body which is formed by a limb in the shape of a circular ring and is also tempered to be in the form of components which are not connected together in one piece. In that case also it is only necessary to ensure that those separate components achieve the same magnetic action as the bodies 8' and 18' which are connected together in one piece.

The latter also applies to a linear encoder in which the yoke body arrangement can be formed by two mutually parallel plates, between which the deflection body extends in the form of a straight limb.

The embodiment shown in FIGS. 5 and 6 is once again a solid-shaft rotary encoder 1 in which the yoke body 9 of the exciter unit 8 forms a cup which is closed at the bottom side, as is also the case in the FIG. 1 embodiment. It will be noted however that here the deflection body 18 is magnetically separated from the yoke body by its being embedded in a non-ferromagnetic body 19 (for example of plastic, aluminium, brass and the like), which connects it non-rotatably to the exciter unit.

As in the other embodiments the deflection body 18' deflects the part of the magnetic field, that passes in the proximity thereof, between the permanent magnets 16, 17, as is symbolically indicated by the magnetic field lines 22, 23, in such a way that the four magnetosensitive elements 25, 26, 27 and 28 (of which only the elements 27 and 26 are visible in the section in FIG. 5) are passed through by a component of the magnetic field lines 22, 23, that is parallel to the longitudinal axis 5. In this case also the magnetosensitive elements 25, 26, 27 and 28 are provided in an IC 24 which is so arranged that the active surfaces thereof face towards the deflection body 18' and are disposed at a small spacing therefrom.

In this embodiment moreover the further permanent magnets 34, 35 of the solid-shaft encoder of FIG. 1 are omitted and the counting unit 30 is disposed in the upper stray field region of the two primary permanent magnets 16, 17.

The four magnetosensitive elements 25 and 26, and 27 and 28 respectively, of the fine-resolution sensor unit 29' are combined together as shown in FIG. 6 by cross-wise interconnection to constitute two groups, as indicated by the two curved double-headed arrow lines. The connections of the two groups in turn extend perpendicularly to the direction of movement of the exciter unit 8 which is not shown in FIG. 6 and whose axis of rotation passes through the intersection point, forming the centre of the arrangement, of the two broken, mutually perpendicular lines 53, 54, perpendicularly to the plane of the drawing, wherein the double-headed arrow R symbolically indicates the direction of rotation of the encoder 1.

The invention claimed is:

1. A magnetic linear or rotary encoder for monitoring the range of movement of a moveable body, wherein the linear or rotary encoder includes the following:
    an exciter unit for reproducing the movement to be monitored, having at least two mutually diametrally oppositely disposed primary permanent magnets which are arranged with a respective one of their poles on a ferromagnetic yoke body and are magnetically connected and which form between their free inwardly directed unlike poles a measuring field space connecting them,
    a stationarily arranged fine-resolution sensor unit which serves to determine a fine position value for the moveable body, and
    an electronic processing means with data memory which evaluates the signals of the fine-resolution sensor unit, wherein
    there is provided a ferromagnetic deflection body which moves with the exciter unit and which deflects at least a part of the magnetic field lines of the magnetic field produced by the primary permanent magnets in a direction perpendicular to the magnetisation vector of the primary permanent magnets,
    the fine-resolution sensor unit includes more than two magnetic field sensors which are so arranged that they are passed through by the magnetic field lines deflected by the deflection body with a perpendicular component,
    at least the yoke body comprises a thermally treated ferromagnetic material, and
    the fine-resolution sensor unit does not contain any ferromagnetic constituents.

2. A linear or rotary encoder according to claim 1 wherein the deflection body also comprises a thermally treated ferromagnetic material.

3. A linear or rotary encoder according to claim 2 wherein the yoke and deflection bodies are combined to form a unit.

4. A linear or rotary encoder according to claim 1 wherein the fine-resolution sensor unit is in the form of an IC having at least three Hall probes.

5. A linear or rotary encoder according to claim 1 in which the range of movement to be monitored is subdivided into two or more measuring segments and which includes a counting sensor unit for counting the measuring segments traversed, wherein the counting sensor unit is stationarily arranged in such a way that the central field of further permanent magnets can pass through it and it responds thereto.

6. A linear or rotary encoder according to claim 1 wherein the unit formed by the yoke and deflection bodies comprises annealed mu-metal.

7. A linear or rotary encoder according to claim 1 wherein at least the fine-resolution sensor unit, the yoke and deflection bodies are protected by a stationary ferromagnetic shield from external magnetic fields and mechanical shocks.

8. A linear or rotary encoder according to claim 1 wherein the primary permanent magnets of the exciter unit are tempered hard magnets.

9. A linear or rotary encoder according to claim 1 wherein the yoke body is in the form of a channel of U-shaped cross-section, which extends in the direction of the movement to be monitored.

10. A linear encoder according to claim 9 wherein the channel of U-shaped cross-section extends straight.

11. A linear or rotary encoder according to claim 1 wherein there are provided four magnetic field sensors which produce the signals a, b, c, d and which are connected in paired relationship in such a way that the signal differences a-d and c-b are produced, wherein the respective connecting line between the magnetic field sensors of each pair of magnetic field sensors is oriented perpendicularly to the direction of movement.

12. A rotary encoder having an encoder shaft according to claim 11 wherein the channel is in the form of a circular ring and concentrically surrounds the encoder shaft.

13. A rotary encoder having an encoder shaft according to claim 1 wherein the yoke body jointly with the deflection body forms a cylindrical cup whose axis extends parallel to the axis of the encoder shaft.

14. A linear or rotary encoder according to claim 1 wherein all electronic components of the linear or rotary encoder, that come into contact with the measuring field produced by the primary permanent magnets include no ferromagnetic constituents.

15. A linear or rotary encoder according to claim 1 further comprising a counting unit for counting the traversed measuring intervals.

* * * * *